March 1, 1966     J. T. PORTER II     3,238,070
ELECTROCHEMICAL FILTER
Filed Feb. 18, 1963
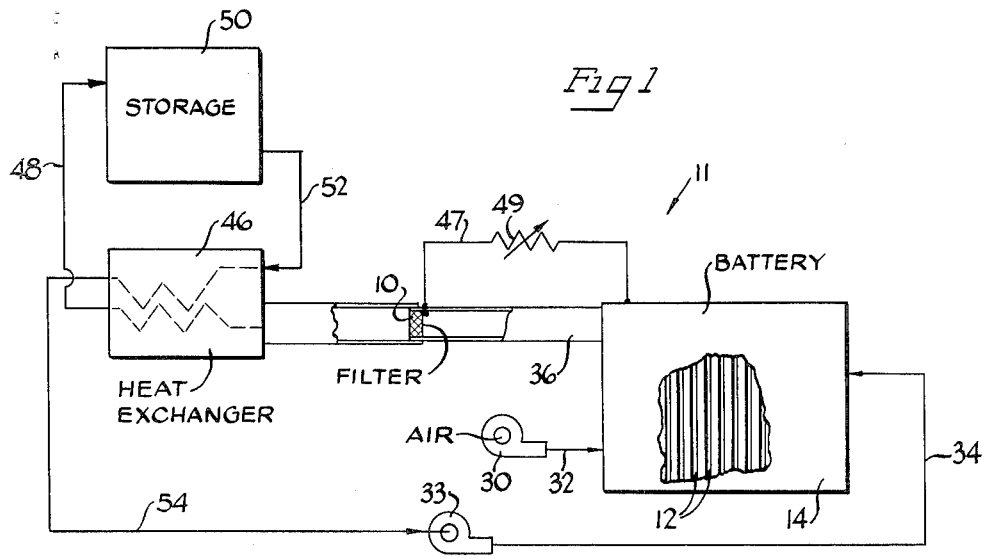
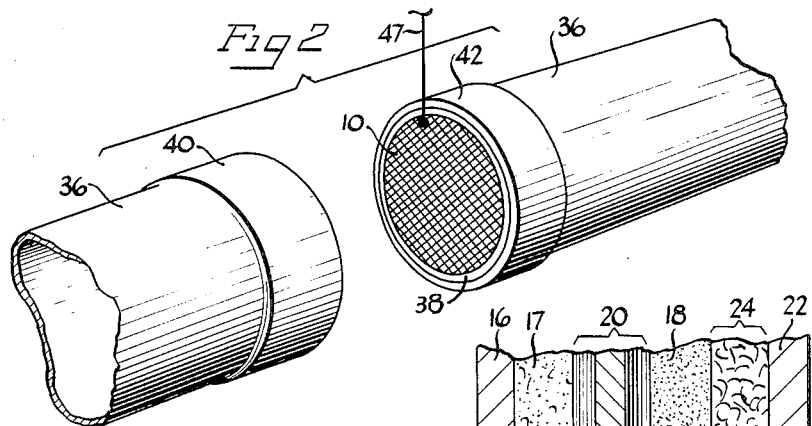
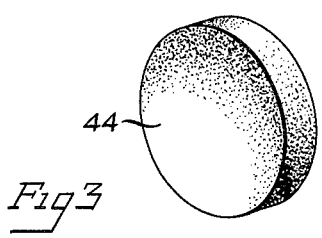
Inventor
John T. Porter II
By
Anderson, Luedeka, Fitch, Even & Tabin
Attys United States Patent Office 3,238,070
Patented Mar. 1, 1966

3,238,070
ELECTROCHEMICAL FILTER
John T. Porter II, Del Mar, Calif., assignor to General Dynamics Corporation, New York, N.Y., a corporation of Delaware
Filed Feb. 18, 1963, Ser. No. 259,017
8 Claims. (Cl. 136—160)

This invention relates to battery systems and more particularly to an apparatus for use in battery systems for maintaining the capacity of such battery systems.

A storage battery may employ a metal anode which decomposes during discharge of the battery, forming products which enter the electrolyte within the battery. When a cell or battery of this type is charged, the metal present in the electrolyte in the form of the products is electrodeposited upon the surface of the anode without removing the anode from its position within the battery. To obtain the greatest amount of power from the battery, and to maintain the capacity of the battery, it is highly desirable for all of the anodic metal present in the electrolyte to become deposited on the surface of the anode during the electrodeposition process.

In recent years, increased work has been done toward creating new forms of storage batteries which have increased energy densities (i.e., power output per unit weight). New storage batteries have been developed which employ new materials as anodes and cathodes, and new methods have been employed which include circulating the electrolyte within the storage battery to remove the products formed during discharge of the battery from within the battery. In many instances, it has been found that particles of anode metal become detached from the anode during charging or discharging of the battery. The use of a circulating electrolyte in a storage battery increases the problem of the detachment of particles of anode metal since the circulating electrolyte creates fluid currents within the battery which buffet the anode and detach from the anode particles of anode metal that are only weakly attached thereto.

The loss of anodic metal as metallic particles within the electrolyte reduces the capacity of the battery. Unless the metal particles are attached to the anode in an electroconducting relationship they will not react with the cathode to produce electricity. Additionally, in most instances the anodic metal particles are not soluble in the electrolyte and remain in the electrolyte as a suspension, as in the case of a circulating electrolyte, or fall to the bottom of the battery where they build up until the battery becomes short circuited.

It is a principal object of the present invention to provide a means for maintaining the capacity of a battery. An additional object is to provide a means for use in a battery system which prevents the accumulation of anodic metal particles within the electrolyte of the battery system.

A further object is to provide a means for causing the solution of anodic metal present in the electrolyte of a battery system which is economical to construct and which is simple in operation.

These and other objects will become apparent by referring to the following detailed description and from the drawing in which:

FIGURE 1 is a schematic flow diagram showing a specific embodiment of the present invention;

FIGURE 2 is an enlarged fragmentary view of a portion of FIGURE 1;

FIGURE 3 shows a second embodiment of the present invention; and

FIGURE 4 shows a fragmentary sectional view of a specific embodiment of a battery cell for use in the battery of FIGURE 1.

In general, the present invention relates to an electrically conducting member 10 which is adapted to be disposed in a battery system 11 in a manner so that insoluble particles of anodic metal present within the electrolyte are solubilized at the surface of the electrically conducting member 10.

Now referring to the drawings in detail, there is shown in FIGURE 1 a storage battery employing a circulating electrolyte and a plurality of individual cells 12 arranged to form a battery 14, which cells preferably are formed of a zinc-oxygen electrochemical couple. As seen in FIGURE 4 each of cells includes an anode backing plate 16 of an inert material such as nickel upon which a zinc anode 17 is disposed as by electrodepositing. An oxygen cathode 18 of an inert porous material such as porous nickel is spaced from the anode 17 to form an electrolyte passageway 20 therebetween. An impervious member 22 of an inert material such as nickel is disposed on the opposite side of the cathode from the anode and is spaced from the cathode 18 to define a gas passageway 24 therebetween.

A porous separator 26, formed from pressed paper board or a porous inert plastic material is disposed within the electrolyte passageway 20 and an electroconducting filter 28, constructed from a material such as stainless steel wool or nickel coated plastic fibers, is disposed in the gas passageway 24. Each of the cells is held together by suitable means (not shown) and a plurality of the cells are arranged in a conventional manner to provide a battery of the desired capacity.

In the illustrated embodiment, an oxygen containing gas (e.g. air) is supplied to the battery 14 and is passed through the gas passageway 24 of each of the cells 12 by a blower 30 through line 32. A caustic electrolyte, such as a 20 percent solution of potassium hdyroxide, is circulated through the electrolyte passageways 20 of the battery 14 by a pump 33 connected in series with an entrance conduit 34 and an exit conduit 36 of the battery. The conduits 34 and 36 are made of an inert material such as nickel, plastic, glass, etc.

As best seen in FIGURE 2, the porous electroconducting member 10 is disposed entirely across the passageway defined by exit conduit 36. The member 10 is in the form of a foraminous screen having a mesh sufficient to permit the electrolyte to pass therethrough but small enough to prevent the passage of particles of anodic metal. A mesh of, for example, 50 mesh is satisfactory for most applications. The member 10 is constructed from an electronconducting material, such as platinum or nickel, which is inert with respect to the caustic electrolyte. The member 10 is insulated from the conduit 36 when the conduit is made of a conductive material by a suitable nonconducting gasket 38 in which the porous member 10 is mounted. However, if the adjacent portions 40 and 42 of conduit 36 are constructed of a nonconducting material, or the conduit line 36 is constructed of a nonconducting material, the gasket 38 need not be employed.

In a second embodiment, the member 10 is in the form of a porous plug 44 of electroconducting fibers. The porous plug 44 is formed from metal fibers, such as nickel or platinum fibers, or from suitable inert fibers having an electroconducting coating thereon, such as coated or impregnated plastic fibers. The porous plug 44 is constructed with a porosity such that the electrolyte easily passes therethrough while the particles of anodic metal present within the electrolyte do not pass therethrough and are retained on the surface of the plug member.

As shown in FIGURE 1, the electroconducting member 10 is coupled externally to the cathode of one of the individual electrolytic cells 12 by means of an external electric conductor 47. Preferably the electric conductor is coupled to the cathode closest to the exit from the battery. A variable resistor 49 is preferably disposed in the conductor 46 to control the current therein.

The zinc oxide storage battery will contain zinc oxide or hydroxide in solution in the electrolyte. The electrolyte may be unsaturated or supersaturated as may be desired. However, the use of an electrolyte that is supersaturated with respect to the zinc oxide or hydroxide reduces the amount of electrolyte required and is preferable where space and weight limitations are present.

After passing through the porous electroconducting member 10 the electrolyte, which had been heated by the waste heat in the battery, is cooled by passing the same through a heat exchanger 46. The electrolyte then passes through a conduit 48 into a storage tank 50 which is at approximately ambient temperature. The electrolyte is withdrawn from the storage tank 50 and passed through conduit 52 through heat exchanger 46 and through conduit 54 to the pump 33 for recirculation through the battery 14. In operation, cooled electrolyte cools the battery 14 to a temperature of from 60° C. to 100° C.

The zinc oxide products (i.e., zinc oxide or hydroxide) formed during the discharge of the zinc-oxygen battery have a greater solubility in a warm aqueous solute than do they in a cool aqueous solute. The zinc oxide products are solubilized in the warm aqueous caustic electrolyte within the battery 14 and pass out of the battery with the electrolyte in line 36. The warm electrolyte passes through the heat exchanger 46, where it is cooled by the cool electrolyte in line 52, and passes through line 48 into the storage tank 50 where the solubilized zinc oxide is precipitated out of solution within the electrolyte at ambient temperatures. In this manner the zinc oxide will not become deposited within the battery proper. In order to enhance the precipitation of the zinc oxide within the storage tank 50, the tank can be filled with a fibrous material, such as aluminum silicate fibers, to provide a greater surface area upon which the precipitation can take place. The cool electrolyte is withdrawn from the storage tank 50 through line 52 and passes through the heat exchanger 46 where it is warmed by the electrolyte in line 36. The warm electrolyte then passes through line 54 to the pump 33 and back into the battery 14.

Any particles of detached anodic zinc which may be present within the cells 12 becomes suspended in the electrolyte when it passes through the battery due to the insolubility of the zinc metal in the caustic electrolyte. The electrolyte is passed through the inert porous electroconducting member 10 and the particles of anodic metal suspended within the electrolyte become deposited upon the surface of the member 10 and are retained upon the surface of member 10 by the pressure exerted on the particles of metal by the flowing electrolyte. The electrolyte present in line 36 forms an electrolytic cell between the oxygen cathode within the battery 14 and the anodic metal particles in contact with the surface of the porous electroconducting member 10. This electrolytic cell is short circuited by the external electric conductor 47 connected to the electroconducting member and the cathode within the cell, causing the anodic solution of the zinc metal in contact with the surface of the porous electroconducting member 10.

Care must be taken in order to prevent the clogging of the pores of the electroconducting member 10 by precipitated products (i.e., zinc oxide or hydroxide) during the discharge of the battery. The porous member is illustrated as being disposed in the exit line 36 for the electrolyte as this is the position at which the least amount of zinc oxide or hydroxide is deposited upon the porous member. Although the concentration of products within the electrolyte is greatest at this point in the battery system, the higher temperature of the electrolyte as it leaves the battery causes the solubility of the products to be greatest at this point with a corresponding lesser amount of the zinc oxide or hydroxide being precipitated upon the surface of the porous member 10. Additionally, the concentration of products in the electrolyte during charging of the battery is least at the exit from the battery and products which might be precipitated upon the surface of the porous member during discharge of the battery are solubilized during charging of the battery.

It is apparent that the porous electroconducting member 10 could be placed in a number of other positions within the flow system of the battery as long as there is provided both an electrolytic path and an external electric path from the electroconducting surface of the porous member to a cathode within the battery. For instance, the electroconducting porous member could be placed in the exit line from the storage vessel.

The electroconducting member need not be constructed of a porous material. It is contemplated that the electroconducting member could be made in the form of a sheet or plate and could, for example, be placed in the bottom of the electrolyte storage tank. As long as both an electrolytic and electric circuit is provided to a cathode of the battery, any anodic metal which settles onto the surface of the electroconducting member will be solubilized.

It is also contemplated to employ the electroconducting member in a battery which does not employ a circulating electrolyte. The electroconducting member can be situated within the battery in a position where the particles of detached anodic metal would come into contact with the surface of the electroconducting member. For example, the electroconducting member could be positioned on the bottom of the electrolytic cell and connected by an external electric conductor to the cathode of the cell. It is to be noted that in applications in noncirculating batteries the electroconducting member can either be of a porous nature or can be a solid member, as may be desired.

In place of an electrolyte path from the electroconducting filter to a cathode within the battery, it is possible to employ an auxiliary cathode within the battery at any convenient location with respect to the electroconducting filter. The auxiliary cathode must be separated from the electroconducting filter, i.e., as by suitable gaskets. The auxiliary cathode could be an air cathode which was not part of the main battery for example, or an inert metal upon which the anode metal would not deposit and provided with an electrical connection to an anode in the battery. Any particle of anodic metal contacting the electroconducting filter will be solubilized by the action of the electrolytic cell.

It can be seen that a means has been provided for maintaining the capacity of a battery and for preventing the accumulation of particles of detached anodic metal within the electrolyte of a battery. It can also be seen that the electroconducting means employed can be of various forms and shapes and can be employed in either circulating or noncirculating electrolytic battery systems.

Various of the features of the invention are set forth in the following claims.

What is claimed is:

1. A secondary battery which comprises an electrolytic cell having first and second electrodes, said first electrode being of a material which is consumed in the current-generating process, means for circulating a fluid electrolyte through said cell, an electroconducting filter disposed so that said electrolyte is circulated therethrough and so that said filter is electrolytically linked to a second electrode through said fluid electrolyte, and means electrically connecting said filter and said linked second electrode to establish a short circuit therebetween whereby particles which become detached from said first consumable electrode collect at said filter and are electrolytically dissolved into said electrolyte.

2. A secondary battery which comprises an electrolytic cell having first and second electrodes, said first electrode being of a material which is consumed in the current-generating process, means for circulating a fluid electrolyte through said cell, a filter made of a fibrous material which is chemically inert to said electrolyte and which is a good electrical conductor disposed so that said electrolyte is circulated therethrough and so that said filter is electrolytically linked to a second electrode through said fluid electrolyte, and means electrically connecting said filter and said second linked electrode to establish a short circuit therebetween whereby particles which become detached from said first consumable electrode collect at said filter and are electrolytically dissolved into said electrolyte.

3. A secondary battery which comprises an electrolytic cell having an anode and a cathode, said anode being of a material which is consumed in the current-generating process, means for circulating a fluid electrolyte through said cell, an electroconducting filter disposed so that said electrolyte is circulated therethrough and so that said filter is electrolytically linked to said anode through said fluid electrolyte, and means electrically connecting said filter and said cathode to establish a short circuit therebetween whereby particles which become detached from said consumable anode collect at said filter and are electrolytically dissolved into said electrolyte.

4. A secondary battery which comprises an electrolytic cell having first and second electrodes, said first electrode being of a material which is consumed in the current-generating process, means for circulating a fluid electrolyte through said cell, a filter disposed so that said electrolyte is circulated therethrough and so that said filter is electrolytically linked to said second electrode through said fluid electrolyte, said filter being made of an electroconductive material chemically inert to said electrolyte and having pores of a sufficiently small size to prevent passage therethrough of particles which may become detached from said first consumable electrode, and means electrically connecting said filter and said second electrode to establish a short circuit therebetween whereby said detached particles collect at said filter and are electrolytically dissolved into said electrolyte.

5. A secondary battery which comprises a plurality of electrolytic cells each having first and second electrodes, said first electrodes being made of a material which is consumed in the current-generating process, means for circulating a fluid electrolyte through said cells, an electroconducting filter disposed so that said electrolyte is circulated therethrough and so that said filter is electrolytically linked to a second electrode through said fluid electrolyte, and means electrically connecting said filter and said linked second electrode to establish a short circuit therebetween whereby particles which become detached from said first consumable electrodes collect at said filter and are electrolytically dissolved into said electrolyte.

6. A secondary battery which comprises a plurality of electrolytic cells each having an anode and a cathode, said anodes being made of a material which is consumed in the current-generating process, means for circulating a fluid electrolyte through said cells, an electroconducting filter disposed so that said electrolyte is circulated therethrough and so that said filter is electrolytically linked to a cathode through said fluid electrolyte, and means electrically connecting said filter and said linked cathode to establish a short circuit therebetween whereby particles which become detached from said consumable anodes collect at said filter and are electrolytically dissolved into said electrolyte.

7. A secondary battery which comprises a plurality of electrolytic cells each having an anode and a cathode, said anodes being made of material which is consumed in the current-generating process, means for circulating aqueous caustic electrolyte through said cells, an electroconducting filter disposed adjacent said plurality of cells so that the discharge of said electrolyte is circulated therethrough and so that said filter is electrolytically linked to the cathode in the closest cell through said fluid electrolyte, and means electrically connecting said filter and said linked cathode to establish a short circuit therebetween whereby particles which become detached from said anodes collect at said filter and are electrolytically dissolved into said electrolyte.

8. A secondary battery which comprises a plurality of interconnected electrolytic cells each having a zinc anode and an oxygen cathode, means for circulating aqueous caustic electrolyte in parallel flow through said cells, means combining the exit flow from each cell into a single discharge line, an electroconducting filter disposed in said discharge line so that said electrolyte passes therethrough and so that said filter is electrolytically linked to the oxygen cathode in the closest cell through said fluid electrolyte, and means electrically connecting said filter and said linked anode to establish a short circuit therebetween whereby particles which become detached from said anodes collect at said filter and are electrolytically dissolved into said electrolyte.

References Cited by the Examiner

UNITED STATES PATENTS

| 1,694,530 | 12/1928 | Davis | 136—179.5 |
|---|---|---|---|
| 2,706,213 | 4/1955 | Lucas | 136—160.2 |

FOREIGN PATENTS

| 433,809 | 8/1935 | Great Britain. |
|---|---|---|

WINSTON A. DOUGLAS, *Primary Examiner.*

JOHN H. MACK, *Examiner.*